United States Patent
Dietz et al.

(10) Patent No.: US 11,689,114 B2
(45) Date of Patent: Jun. 27, 2023

(54) CONTROL FACILITY FOR A DC LINK CONVERTER AND DC LINK CONVERTER

(71) Applicant: Siemens Aktiengesellschaft, Munich (DE)

(72) Inventors: Bernd Dietz, Herzogenaurach (DE); Gerald Reichl, Erlangen (DE); Elmar Schäfers, Fürth (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 259 days.

(21) Appl. No.: 17/219,223

(22) Filed: Mar. 31, 2021

(65) Prior Publication Data

US 2021/0313899 A1    Oct. 7, 2021

(30) Foreign Application Priority Data

Apr. 1, 2020  (EP) .................................... 20167561

(51) Int. Cl.
  *H02M 5/458*  (2006.01)
  *B29C 43/58*  (2006.01)
  *B30B 15/14*  (2006.01)

(52) U.S. Cl.
  CPC ............. *H02M 5/458* (2013.01); *B29C 43/58* (2013.01); *B30B 15/148* (2013.01)

(58) Field of Classification Search
  CPC ....... H02M 5/458; B29C 43/58; B30B 15/148
  USPC .......................................................... 318/567
  See application file for complete search history.

(56) References Cited

U.S. PATENT DOCUMENTS

| 2005/0258795 | A1  | 11/2005 | Choi |
| 2019/0115759 | A1* | 4/2019  | Shinoda ................ H02P 25/22 |
| 2019/0115858 | A1* | 4/2019  | Shinoda ................ H02P 27/08 |
| 2020/0343836 | A1* | 10/2020 | Shinoda ................ H02P 5/74 |

FOREIGN PATENT DOCUMENTS

| EP | 2 525 481 A1 | 11/2012 |
| EP | 2 525 481 B1 | 2/2017 |
| JP | 2015104210 A  * | 6/2015 |

* cited by examiner

*Primary Examiner* — Kawing Chan
(74) *Attorney, Agent, or Firm* — Henry M. Feiereisen LLC

(57) ABSTRACT

A control facility for a DC link converter includes a power regulator, which determines, based on an actual power determined at least partially at the feed converter, a power-based desired moment component for a kinetic energy store. The invention also relates to a DC link converter controlled by the control facility and to a forming machine, such as a press, with a DC link converter controlled by the control facility.

18 Claims, 9 Drawing Sheets

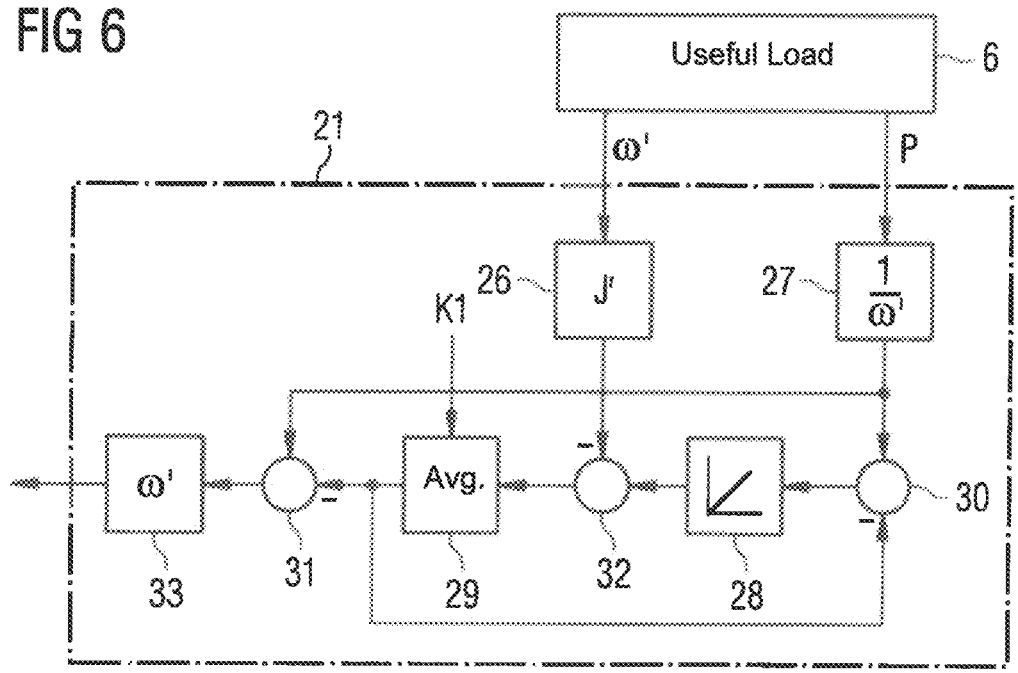
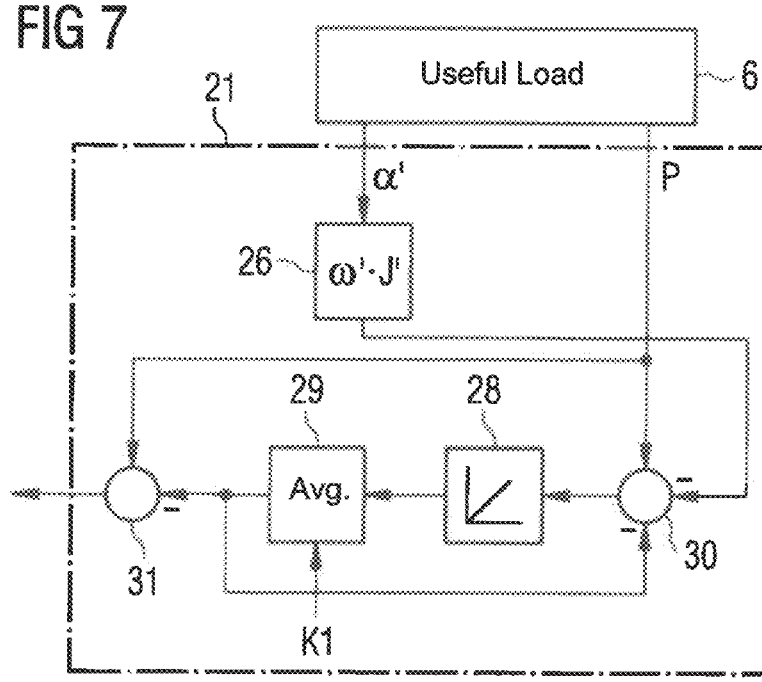

CONTROL FACILITY FOR A DC LINK CONVERTER AND DC LINK CONVERTER

CROSS-REFERENCES TO RELATED APPLICATIONS

This application claims the priority of European Patent Application, Serial No. 20167561.8, filed Apr. 4, 2020, pursuant to 35 U.S.C. 119(a)-(d), the content of which is incorporated herein by reference in its entirety as if fully set forth herein.

BACKGROUND OF THE INVENTION

The present invention relates to a control facility for a DC link converter and to a DC link converter controlled by the control facility.

The following discussion of related art is provided to assist the reader in understanding the advantages of the invention, and is not to be construed as an admission that this related art is prior art to this invention.

Large machines, which include, for example, servo presses and hydraulic presses, are subject to great fluctuations in power fluctuations during operation. They are therefore operated with kinetic energy stores in order to minimize a feed power and to keep changing power components in the DC link constant.

It would therefore be desirable and advantageous to provide an improved control facility for a DC link converter to obviate prior art shortcomings.

SUMMARY OF THE INVENTION

According to one aspect of the invention, a control facility for controlling a DC link converter, with the DC link converter including a DC link with a DC link capacitor and receiving electrical energy from a feed converter connected to a supply network and supplying electrical energy to a useful load via a load converter, with the DC link converter further including a buffer converter coupled to a DC link of the DC link converter and connected to a kinetic energy store for bidirectional energy exchange, the control facility comprising a first voltage regulator determining, based on a desired voltage and an actual voltage that drops across the DC link capacitor, a desired current for the feed converter and controlling the feed converter based on the determined desired current, a speed regulator determining, based on a desired speed and an actual speed of the kinetic energy store, a first desired moment component for the kinetic energy store, a power regulator determining, based on an actual power that is at least partially determined at the feed converter, a power-based desired moment component for the kinetic energy store, and a node adding the first desired moment component and the power-based desired moment component to form a desired moment and controlling the buffer converter using the formed desired moment.

With the invention, a regulating method or control method for energy management employing mechanical energy storage is advantageously expanded as a result. On the one hand, the invention represents a good alternative to the above-mentioned control facility for a DC link converter. Furthermore, adjustability of the energy management to the respective machines is simplified and improved.

According to another advantageous feature of the invention, the actual power can be formed based on the actual voltage and the desired current or based on the actual voltage and an actual current directed through the feed converter.

Advantageously, the actual power can be formed based on the actual voltage and an actual current directed through the feed converter.

According to another advantageous feature of the invention, the power regulator can be designed as a P controller with a proportional amplification.

According to another advantageous feature of the invention, the power regulator can include at least one high-pass filter. The high-pass filter is used, in particular, for the elimination of a DC component of the actual power.

According to another advantageous feature of the invention, a desired value of the power regulator for the elimination of an AC component of the high-pass filtered actual power can be 0 ("zero").

With the invention, energy management with a kinetic energy store for machines with high power fluctuation is advantageously very successfully implemented by using the afore-described power regulator. Advantageously, the control variable of the power regulator can be the manipulated variable of the voltage regulator of the feed. The AC component thereof is advantageously eliminated by the power regulator.

Since two regulators are set for the same control variable, in particular the voltage, specific parameterization of the feed may be omitted. The feed can therefore be operated with a standard parameterization set at the factory.

The result of energy management is improved since the DC link voltage does not fluctuate very much.

Furthermore, it is advantageous that the invention manages without information in respect of a power demand of the user (for example for servo presses), which is connected to the DC link and draws power or outputs power. The method can therefore be implemented self-sufficiently. Moreover, it is possible with the invention to retrofit existing systems, so they also have energy management available. This is advantageously achieved with the described regulation, at least one energy storage motor, at least one converter and a control unit.

According to another advantageous feature of the invention, the control facility can implement a second voltage regulator in which, based on the desired voltage and the actual voltage, a second desired moment component is determined for the kinetic energy store, wherein with the existence of a first system configuration, the second voltage regulator is activated and the power regulator is deactivated, wherein with the existence of a second system configuration, the second voltage regulator is deactivated and the power regulator is activated, wherein with the existence of the first system configuration, the first and the second desired moment component are added to a desired moment and the buffer converter is regulated accordingly, wherein with the existence of the second system configuration, the first and the power-based desired moment component are added to a desired moment and the buffer converter is regulated accordingly.

The power regulator and the second voltage regulator can be implemented in this embodiment, but only one of the two acts in a manner specific to the system. This embodiment is advantageous since a control facility can be used for a large number of system types and requirements.

According to another advantageous feature of the invention, the second voltage regulator can be designed as a P controller and a proportional amplification of the second voltage regulator is determined in such a way that the second voltage regulator to a large extent corrects a desired value jump during part of a period.

According to another advantageous feature of the invention, an instantaneous power demand can oscillate with a period between a minimum value and a maximum value, wherein the first voltage regulator is designed as a PI controller, which has a proportional amplification and a reset time, wherein the proportional amplification and the reset time of the first voltage regulator are determined in such a way that the first voltage regulator corrects a desired value jump during a period to only a small extent.

According to another advantageous feature of the invention, the control facility can implement a pilot control circuit, wherein the instantaneous power demand is supplied to the pilot control circuit, wherein the pilot control circuit high-pass filters the instantaneous power demand, wherein, based on the high-pass-filtered instantaneous power demand, the pilot control circuit determines a pilot control signal, which, in addition to the first desired moment component and the power-based desired moment component or the first desired moment component and the second desired moment component, is included in the desired moment by way of addition.

According to another advantageous feature of the invention, the control facility can be designed in such a way that in a first operating state of the control facility, both the power-based voltage regulator and the pilot control circuit are activated and in a second operating state of the control facility, alternatively the power-based voltage regulator is activated and the pilot control circuit is deactivated or the power-based voltage regulator is deactivated and the pilot control circuit is activated.

According to another advantageous feature of the invention, the first operating state of the control facility can be the routine operation of the DC link converter, wherein the second operating state of the control facility is the start-up of the DC link converter.

According to another advantageous feature of the invention, the pilot control circuit can include an integrator and a delay element connected downstream of the integrator, wherein the pilot control signal is supplied to the integrator and wherein the integrated and delayed pilot control signal is supplied to the speed regulator as an additional input signal.

According to another advantageous feature of the invention, an instantaneous power demand can oscillate with a period between a minimum value and a maximum value, wherein the speed regulator is designed as a PI controller, which has a proportional amplification and a reset time, wherein the proportional amplification and the reset time of the speed regulator are determined in such a way that the speed regulator to a large extent corrects a desired value jump during part of a period.

According to another advantageous feature of the invention, the instantaneous power demand can oscillate with a period between a minimum value and a maximum value, wherein the speed regulator is designed as a P controller, which has a proportional amplification and a reset time, and wherein the proportional amplification and the reset time of the speed regulator are determined in such a way that the speed regulator corrects a desired value jump during a period to only a small extent.

According to another aspect of the invention, a DC link converter includes a DC link with a DC link capacitor, a feed converter supplying electrical energy from a supply network to the DC link, a load converter supplying electrical energy from the DC link to a useful load, a buffer converter which couples a kinetic energy store to the DC link for bidirectional energy exchange, and a control facility, which controls the feed converter, the load converter and the buffer converter and which includes a first voltage regulator determining, based on a desired voltage and an actual voltage that drops across the DC link capacitor, a desired current for the feed converter and controlling the feed converter based on the determined desired current, a speed regulator determining, based on a desired speed and an actual speed of the kinetic energy store, a first desired moment component for the kinetic energy store, a power regulator determining, based on an actual power that is at least partially determined at the feed converter, a power-based desired moment component for the kinetic energy store, and a node adding the first desired moment component and the power-based desired moment component to form a desired moment and controlling the buffer converter using the formed desired moment.

A kinetic energy store can be advantageously designed as a rotating flywheel. A kinetic energy store may also be a dynamoelectric rotatory machine, in particular a rotor of a dynamoelectric rotary machine. Furthermore, the kinetic energy store can also be a dynamoelectric rotatory machine with an inertia device, for example a disk on the motor shaft.

According to still another aspect of the invention, a forming machine, in particular a press, includes a DC link converter as set forth above.

The invention is particularly suitable for forming machines with tools moving relative to one another in a straight line. These tools include, for example presses, in particular screw presses, hydraulic presses, servo presses and pneumatic presses. The invention is also suitable for forging hammers and centrifuges and for all applications in which a kinetic energy store is present or will be required. The invention has the advantage that a power can be kept constant.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 6 shows one possible embodiment of the high-pass filter of FIG. 4 and FIG. 5, FIG. 7 shows one possible embodiment of the high-pass filter of FIG. 4 and FIG. 5.

DETAILED DESCRIPTION OF PREFERRED EMBODIMENTS

Figure 1:
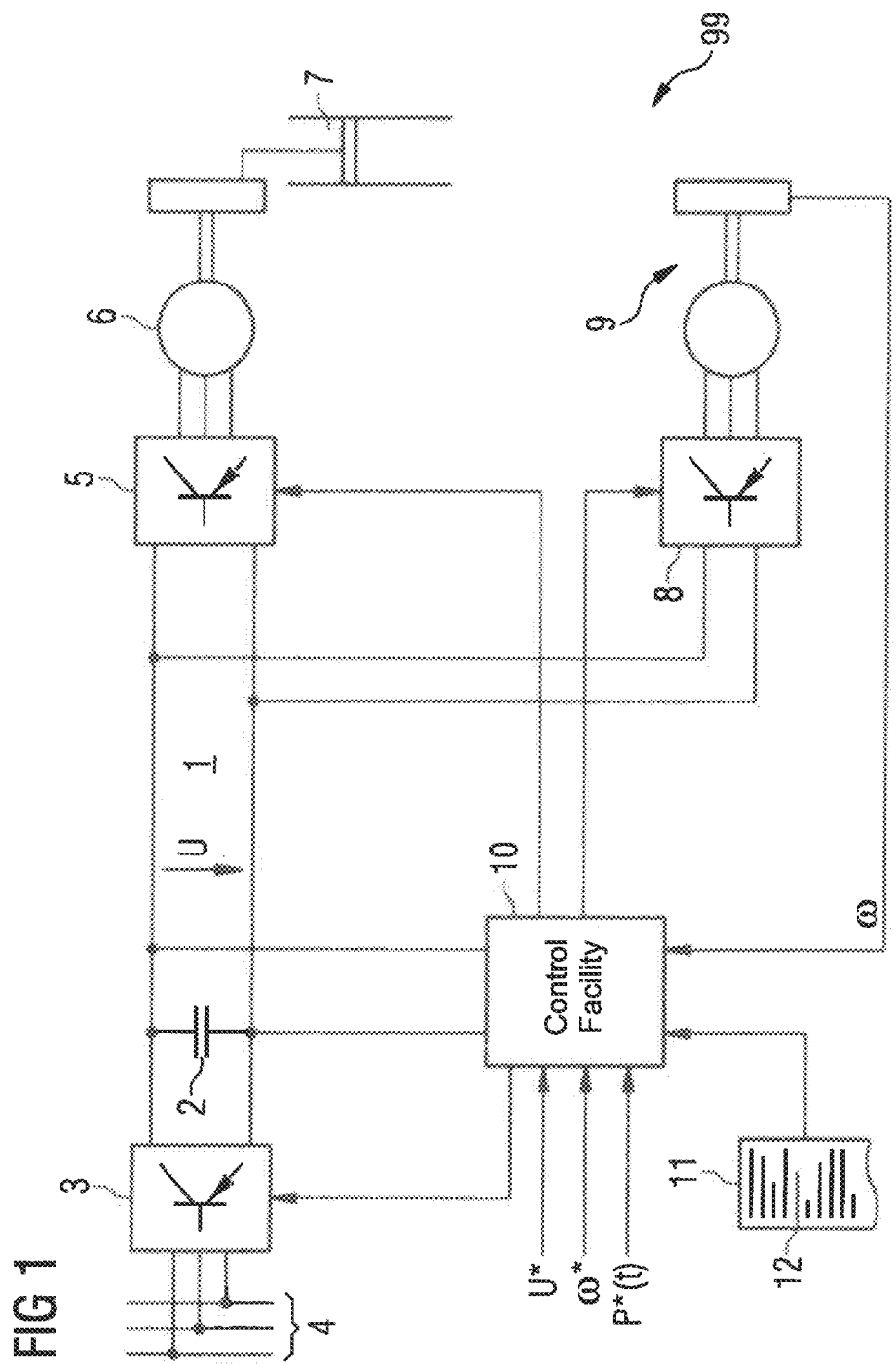
FIG. 1 shows a DC link converter, having a DC link.

Throughout all the figures, same or corresponding elements may generally be indicated by same reference numerals. These depicted embodiments are to be understood as illustrative of the invention and not as limiting in any way. It should also be understood that the figures are not necessarily to scale and that the embodiments are sometimes illustrated by graphic symbols, phantom ones, diagrammatic representations and fragmentary views. In certain instances, details which are not necessary for an understanding of the present invention or which render other details difficult to perceive may have been omitted.

Turning now to the drawing, and in particular to FIG. 1, there is shown a DC link converter 99, having a DC link 1. A DC link capacitor 2 is arranged in the DC link 1. An actual voltage U drops across the DC link capacitor 2. FIG. 1 also shows a feed converter 3 which is designed in such a way that electrical energy is fed from a supply network 4 into the DC link 1 via the feed converter 3. The feed converter 3 is advantageously a controlled converter. The feed converter 3 advantageously has GTOs (=gate turn off thyristors) or IGBTs (=Insulated Gate Bipolar Transistors). Other semiconductor elements are also possible, however. Provision is further made for a load converter 5 which is designed in such a way that electrical energy is supplied from the DC link 1 to a useful load 6 via the load converter 5.

Figure 2:
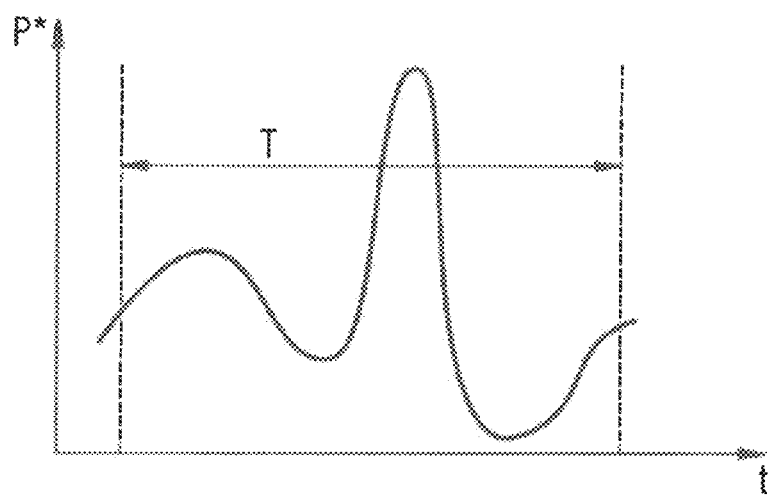
FIG. 2 shows one possible course of the instantaneous power demand.

The useful load can be a synchronous machine of a servo press, which moves, for example, a press ram 7 up and down in a specified movement pattern. The useful load 6 can be periodically operated. In this case, an instantaneous power demand P* of the useful load 6 oscillates as a function of time t with a period T between a minimum value $P_{min}$ and a maximum value $P_{max}$. This is shown in FIG. 2.

The DC link converter 99 includes a buffer converter 8. A rotating flywheel 9 is coupled to the DC link 1 via the buffer converter 8 as an example of a kinetic energy store. This is advantageous since it enables a bidirectional energy exchange. It is possible, therefore to uncouple electrical energy from the DC link 1 and accelerate the flywheel 9 thereby. It is possible, moreover, to decelerate the flywheel 9 and feed electrical energy into the DC link 1.

A kinetic energy store can be designed as a rotating flywheel, therefore. A kinetic energy store can also be a dynamoelectric rotatory machine, in particular a rotor of a dynamoelectric rotatory machine. Furthermore, the kinetic energy store can also be a dynamoelectric rotatory machine with an inertia device, for example a disk on a motor shaft.

Accelerating and decelerating of the flywheel 9 advantageously occurs in a push-pull manner in relation to the course over time of the instantaneous power demand P*. Consequently, the mean power drain from the supply network 4 can be kept more or less constant. The rotating flywheel 9 is advantageously an independent flywheel, which is flanged to an electrical machine.

As an alternative, it is possible that the flywheel 9 is identical to the rotor of the electric machine itself. In this case, the electrical machine can be designed as an external rotor motor.

As further shown in FIG. 1, the DC link converter 99 includes a control facility 10. The control facility 10 is advantageously designed as a programmable control facility. Its mode of action is determined by a system program 11. The system program 11 includes machine code 12, which can be processed directly by the control facility 10, Advantageously, the system program 11 cannot be changed by a user of the DC link converter. The system program 11 determines, in particular, the cooperation of the different converters 3, 5 and 8 of the DC link converter.

FIG. 2 is a graphical illustration of a possible course of the instantaneous power demand P*. The course over time of the instantaneous power demand P* and optionally also other courses over time, such as a velocity curve, can be specified as required.

Figure 3:
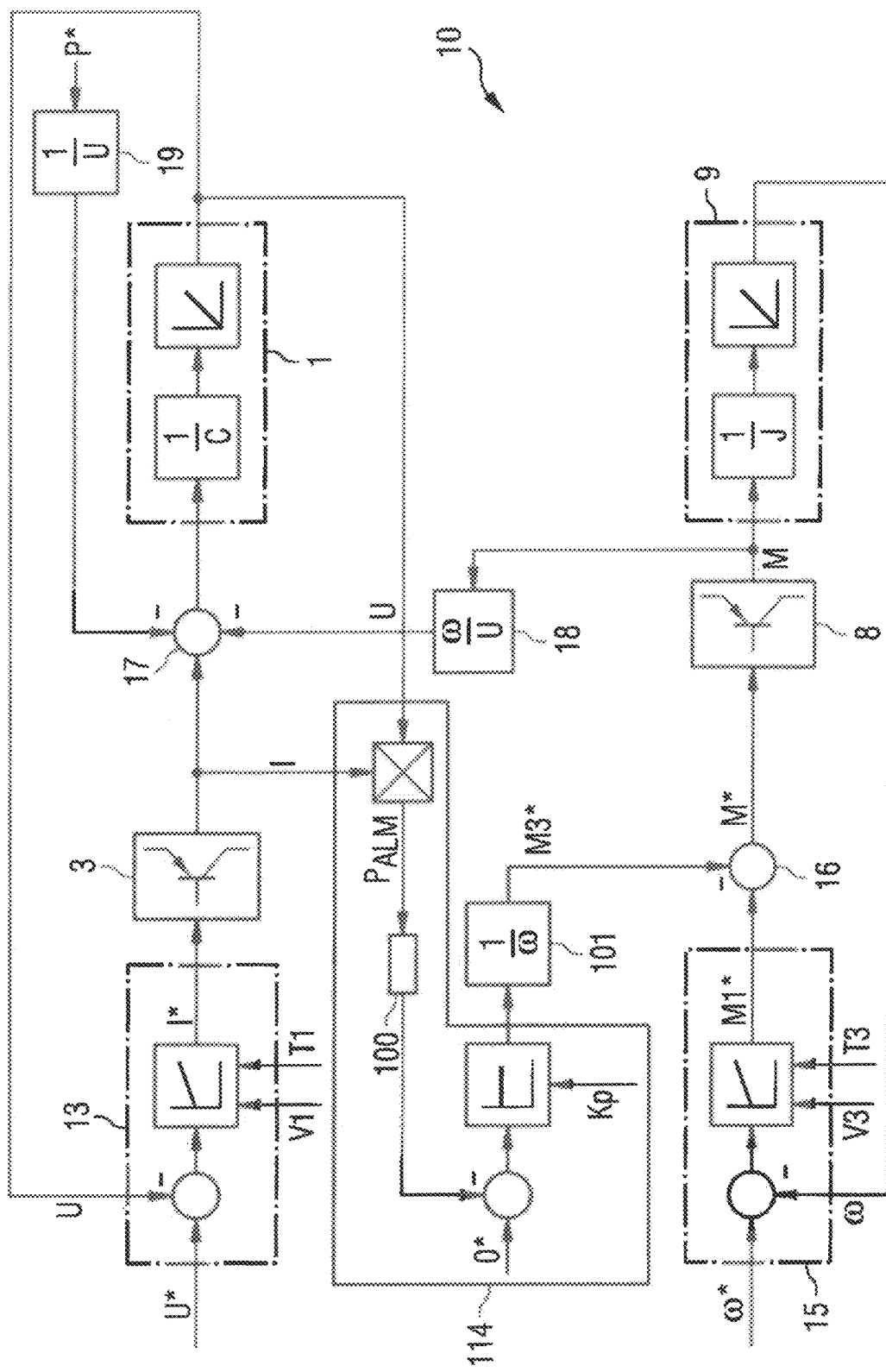
FIG. 3 shows one possible embodiment of the internal structure of the control facility.

The maximum value usually lies above one megawatt. The minimum value $P_{min}$ lies either in the (positive) low kilowatt range or hi some cases is even negative. If the minimum value is negative, electrical energy can be fed back into the DC link 1 for negative instantaneous power demands P*, FIG. 3 shows a possible embodiment of an internal structure of the control facility 10. The control facility 10 includes a first voltage regulator 13, a speed regulator 15 and a power regulator 114. Use of the power regulator 114 represents an improvement compared to a structure which employs a second voltage regulator.

A desired voltage U* and the actual voltage U of the DC link, i.e. the voltage U, which drops across the DC link capacitor 2, is supplied to the first voltage regulator 13, as shown in FIG. 3. The desired voltage U* can be variable over time. Currently preferred is however the desired voltage U* is constant. Based on the desired voltage U* and the actual voltage U, the first voltage regulator 13 determines a desired current I* for the feed converter 3. The feed converter 3 is regulated according to the desired current I*.

A desired speed ω* and an actual speed ω of the flywheel 9 are supplied to the speed regulator 15. The desired speed ω* can be variable over time or constant. If the desired speed ω* is variable, it varies counter to the instantaneous power demand P*. Based on the desired speed ω* and the actual speed ω, the speed regulator 15 determines a first desired moment component M1* for the flywheel 9.

The actual voltage U and the desired current r are supplied to the power regulator 114. Based on the actual voltage U and the desired current I*, the power regulator 114 determines a power-based desired moment component M3* for the flywheel 9.

The first desired moment component M1* and the power-based desired moment component M3* are supplied to a node 16. There, the desired moment components M1* and M3* are added to a desired moment M*.

The buffer converter 8 is regulated according to the desired moment M* determined in the node 16. The flywheel 9, whose moment of inertia is designated with reference character J in FIG. 3, is accelerated or delayed with a corresponding actual moment M, therefore.

In a node 17, the effects of the desired or actual M*, M, suitably of the actual moment M, the flywheel 9 and the instantaneous power demand P* on the DC link 1 are considered in addition to the desired current I*, Advantageously, the moment M of the flywheel 9 and the instantaneous power demand P* of the useful load 6 should be suitably scaled before consideration. This takes place in blocks 18, 19. The respective scaling factor ω/U or 1/U is indicated in the respective block 18 or 19.

Currently preferred is to design the first voltage regulator 13 as a PI controller which has a proportional amplification V1 and a reset time T1. Since the first voltage regulator 13 is intended to react to short-term fluctuations in the actual voltage U, i.e., to fluctuations within the period T, to only a limited extent, the first voltage regulator 13 is parameterized relatively weakly. The proportional amplification V1 can advantageously have a relatively low value. Furthermore, the reset time T1 advantageously has a relatively high value. The proportional amplification V1 and the reset time T1 are determined in such a way that the first voltage regulator 13 corrects a desired value jump during a period T to only a small extent, for example to 5% to 20% or at most 25%.

As further shown in FIG. 3, the power regulator 114 can be designed as a P controller. The power regulator 114 has a proportional amplification Ftp. A measured value of the P controller is an actual power, i.e., the power calculated from the actual voltage U of the DC link and the desired current I* of the feed-in. A DC component is removed from the actual power $P_{ALM}$ by a high-pass filter 100 that is to be parameterized. As the power regulator is intended to eliminate AC components, the desired value is zero (shown by 0*), Advantageously, scaling takes place with the scaling factor 1/ω in block 101 in order to obtain the power-based desired moment component M3* for the flywheel 9.

Advantageously, the proportional amplification Kp of the power regulator 114 is relatively large in order for the power regulator 114 to also react to short-term fluctuations in the actual voltage U. The proportional amplification Kp should be determined in such a way that the power regulator 114 to a large extent corrects a desired value jump during part of the period T—at most half of the period T—, i.e., to at least 50%, preferably to at least 70% or more.

As shown in FIG. 3, the speed regulator 15 is designed as a PI controller. The speed regulator 15 has a proportional amplification V3 and a reset time T3. The speed regulator 15 is advantageously parameterized relatively weakly. Advantageously, the same design criteria apply to the speed regulator 15 as to the first voltage regulator 13.

Figure 4:
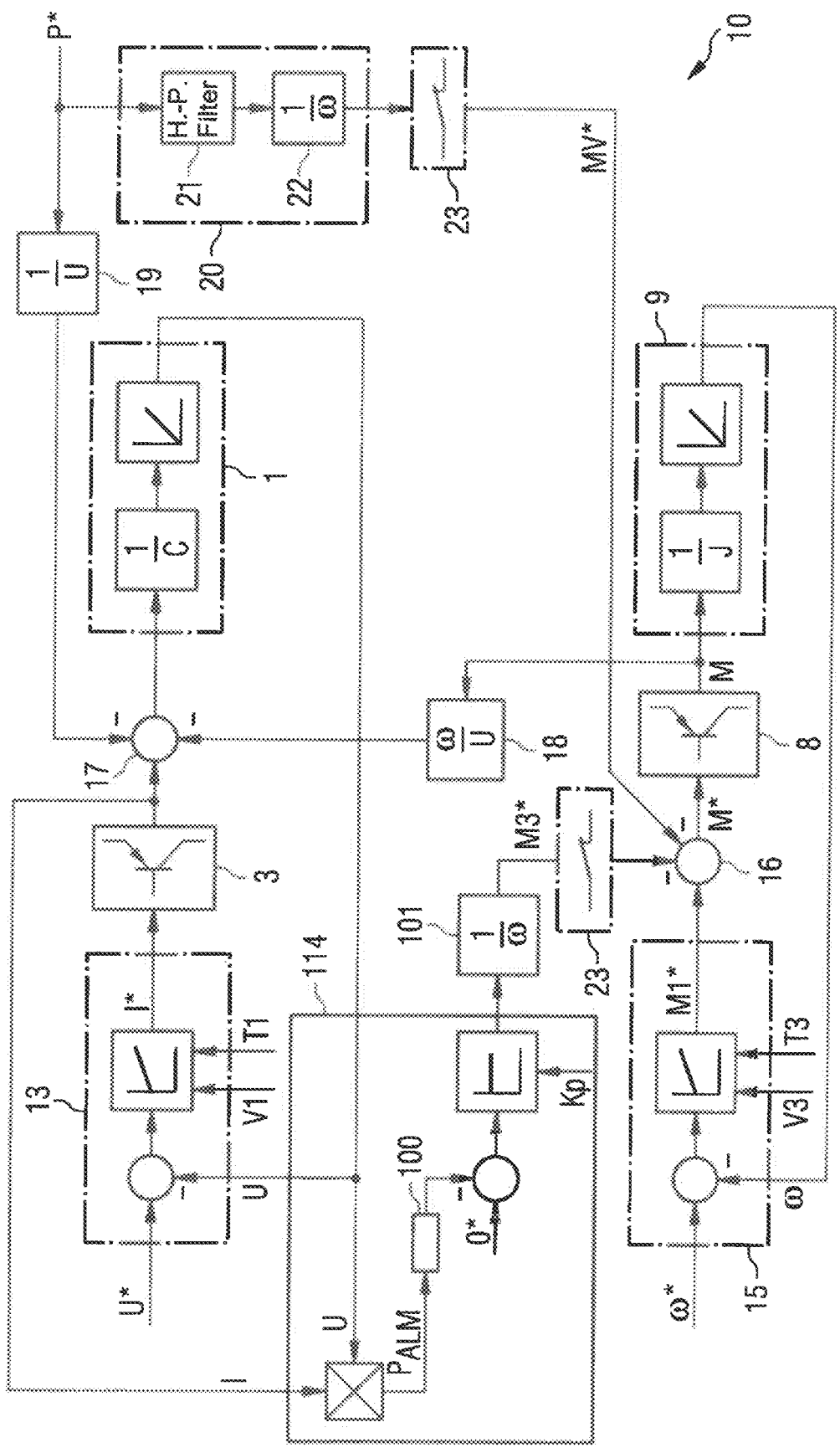
FIG. 4 shows one possible embodiment of the internal structure of the control facility with a pilot control circuit.

FIG. 4 shows a possible embodiment of an internal structure of the control facility 10 with a pilot control circuit 20. The pilot control circuit 20 includes a high-pass filter 21. The instantaneous power demand P* is supplied to the high-pass filter 21 which high-pass filters the instantaneous power demand P*, Based on the high-pass-filtered instantaneous power demand, the pilot control circuit 20 determines a pilot control signal MV*. The filtered instantaneous power demand is suitably scaled in a block 22, The scaling factor 1/w is given in block 22. As shown in FIG. 4, the pilot control signal MV* is supplied to the node 16 and added there to the first desired moment component M1 and to the power-based desired moment component M3*. The pilot control signal MV* is included in the desired moment M* by way of addition, therefore.

In accordance with the representation of FIG. 4, both the power regulator 114 and the pilot control circuit 20 may be permanently active. Alternatively, this may be the case only in a first operating state of the control facility 10. In this case, in a second operating state of the control facility 10, one of the two elements 114, 20, i.e. either the power regulator 114 or the pilot control circuit 20, but not the power regulator 114 and the pilot control circuit 20, can be deactivated. The other element 20, 114 respectively is also activated in the second operating state of the control facility 10. The possibility of deactivating the elements 114, 20 is indicated in FIG. 4 by corresponding switches 23, shown in broken lines. The first operating state of the control facility 10, in which both the power regulator 114 and the pilot control circuit 20 are activated, may involve the routine operation of the DC link converter. The second operating state of the control facility 10, in which one of the elements 114, 20 is deactivated, may involve the start-up of the DC link converter. In the presence of the pilot control circuit 20, the pilot control may be limited according to the representation of FIG. 4 to the direct moment pilot control.

Figure 5:
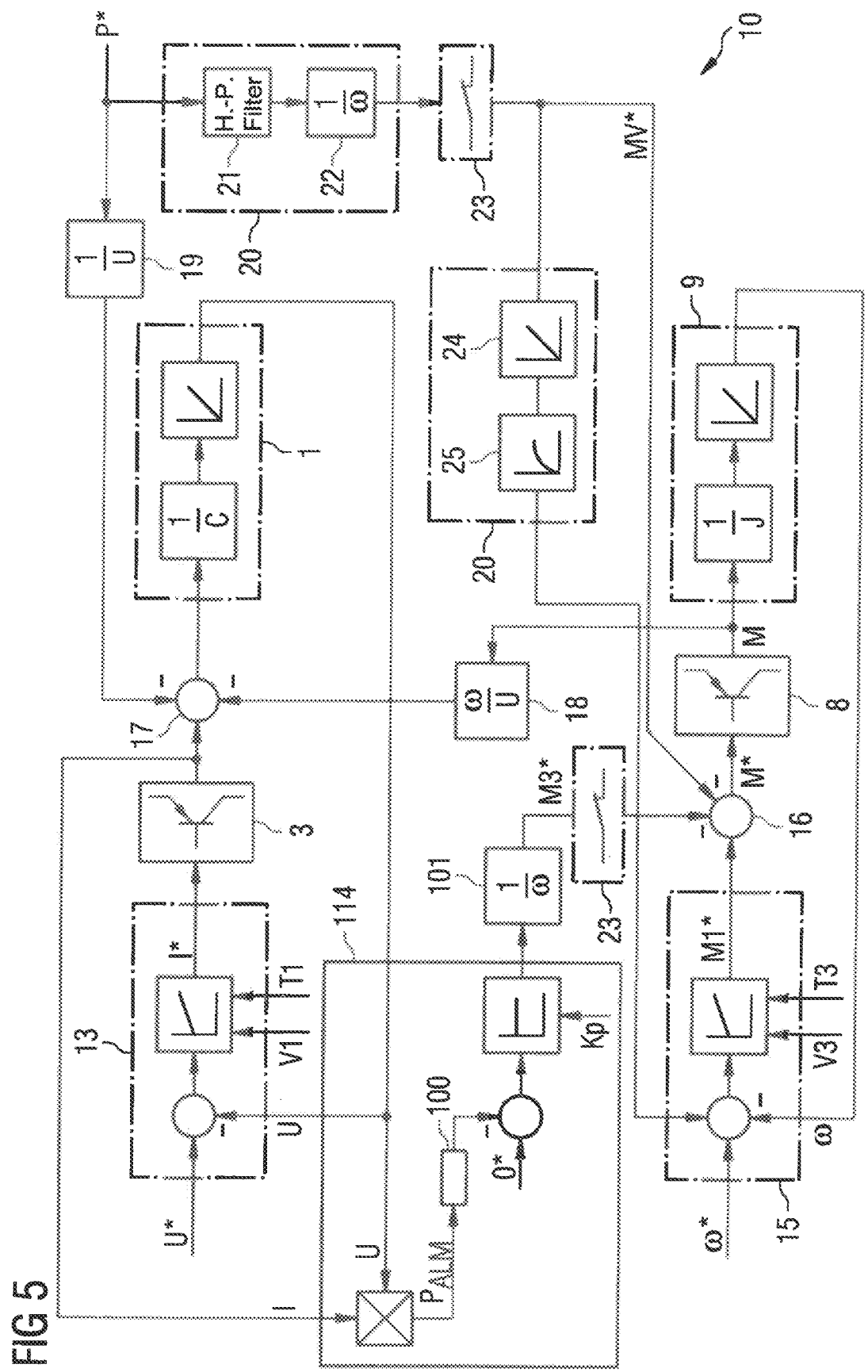
FIG. 5 shows a further possible embodiment of the internal structure of the control facility.

Alternatively, according to FIG. 5, the pilot control circuit 20 may also include an integrator 24 and a delay element 25. FIG. 5 shows a further possible embodiment of an internal structure of the control facility 10. A delay element 25 is connected downstream of an integrator 24. In this case, the pilot control signal MV*—in addition to switching-on in node 16—is supplied to the integrator 24 and integrated there. The output signal of the integrator 24 is supplied to the delay element 25 and delayed there by a delay time. The integrated and time-delayed pilot control signal is supplied to the speed regulator 15 as an additional input signal. The delay of the delay element 25 is preferably determined in such a way that it compensates the real delay that occurs, i.e. the period which elapses between switching-on of the pilot control signal MV* at the node 16 and the change caused thereby to the actual speed ω.

In the embodiment of FIG. 5, the speed regulator 15 can be parameterized analogous to the embodiments in FIG. 3 and FIG. 4. In contrast to the embodiments in FIG. 3 and FIG. 4, in the embodiment according to FIG. 5, the speed regulator 15 may be parameterized more strongly. It is possible to determine the proportional amplification V3 and the reset time T3 of the speed regulator 15 in such a way that the speed regulator 15 to a large extent corrects a desired value jump during part of the period T.

FIG. 6 shows a possible embodiment of the high-pass filter 21 in FIG. 4 and FIG. 5. In order to realize the high-pass filter 21, the control facility 10 can implement, for example, a structure as will be explained below. According to FIG. 6, the instantaneous power P and the instantaneous speed ω' of the useful load 6 (or of the corresponding electrical drive) are acquired. The speed ω' is scaled in a block 26 with the effective moment of inertia J' of the useful load 6; the instantaneous power P in a block 27 with the instantaneous speed ω'. The scaled variables are processed further. As shown in FIG. 6, the high-pass filter 21 includes an integrator 28 and an averager 29.

Nodes 30, 31, 32 are respectively located upstream of the integrator 28, downstream of the averager 29, and between the integrator 28 and the averager 29. The scaled instantaneous power and (with a negative sign) the output signal of the averager 29 are supplied to the node 30 upstream of the integrator 28. Firstly, the output signal of the integrator 28 and secondly, (with negative sign) the scaled speed ω' is supplied to the node 32 between the integrator 28 and the averager 29. The scaled instantaneous power and (with negative sign) the output signal of the averager 29 are supplied to the node 31 downstream of the averager 29. The signal produced at the node 31 is scaled in a block 33 with the instantaneous speed ω' of the useful load 6. The averager 29 averages the input signal supplied to it with a time constant K1. The time constant K1 can be freely selected. The time constant sets the frequency behavior of the high-pass filter 21. Advantageously, the time constant K1 is greater than the period T. The ratio of the two variables K1 and T can lie between two and ten, FIG. 7 shows another possible embodiment of the high-pass filter 21 in FIG. 4 and FIG. 5, While in FIG. 6, the useful load moment is high-pass-filtered, it is more advantageous to use the load power directly according to FIG. 7. In FIG. 7, instead of the speed ω' of the useful load 6, the angular acceleration α' of the useful load 6 is utilized. Furthermore, the structure of the high-pass filter 21 can be seen in FIG. 7. The reference numerals and variables used correspond with those of FIG. 6.

Figure 8:
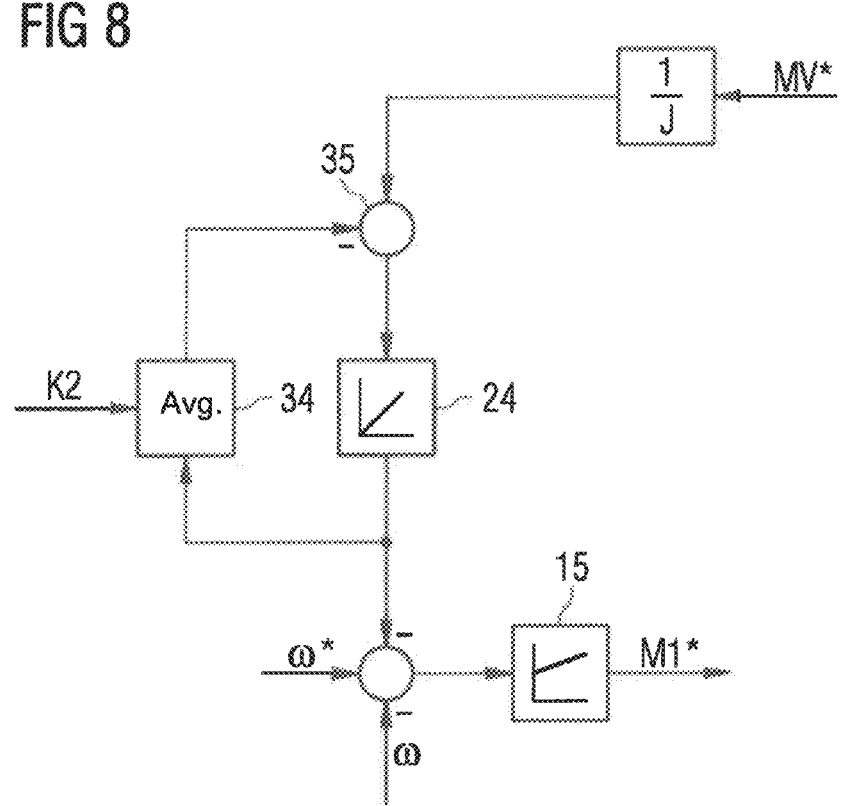
FIG. 8 shows one possible embodiment of a correction block.

FIG. 8 shows a possible embodiment of a correction block. In order to realize the integrator 24, apart from the delay element 25 connected downstream in FIG. 5, the control facility 10 can implement, for example, a structure, as will be explained in more detail below, According to FIG. 8, an averager 34 is connected in the opposite direction and parallel to the integrator 24. Furthermore, a node 35 is upstream of the integrator 24. The pilot control signal MV* and (with negative sign) the output signal of the averager 34 are supplied to the node 35. The output signal of the integrator 24 is supplied on the one hand to the speed regulator 15 as an additional input signal and on the other hand to the averager 34 as the input signal thereof. The averager 34 corresponds to an implementation of the delay element 25 of FIG. 5, It averages the input signal supplied to it with a time constant K2, The time constant K2 can be freely selected. The time constant sets the time delay of the delay element 25.

The present invention can advantageously be easily implemented and operated reliably.

Figure 9:
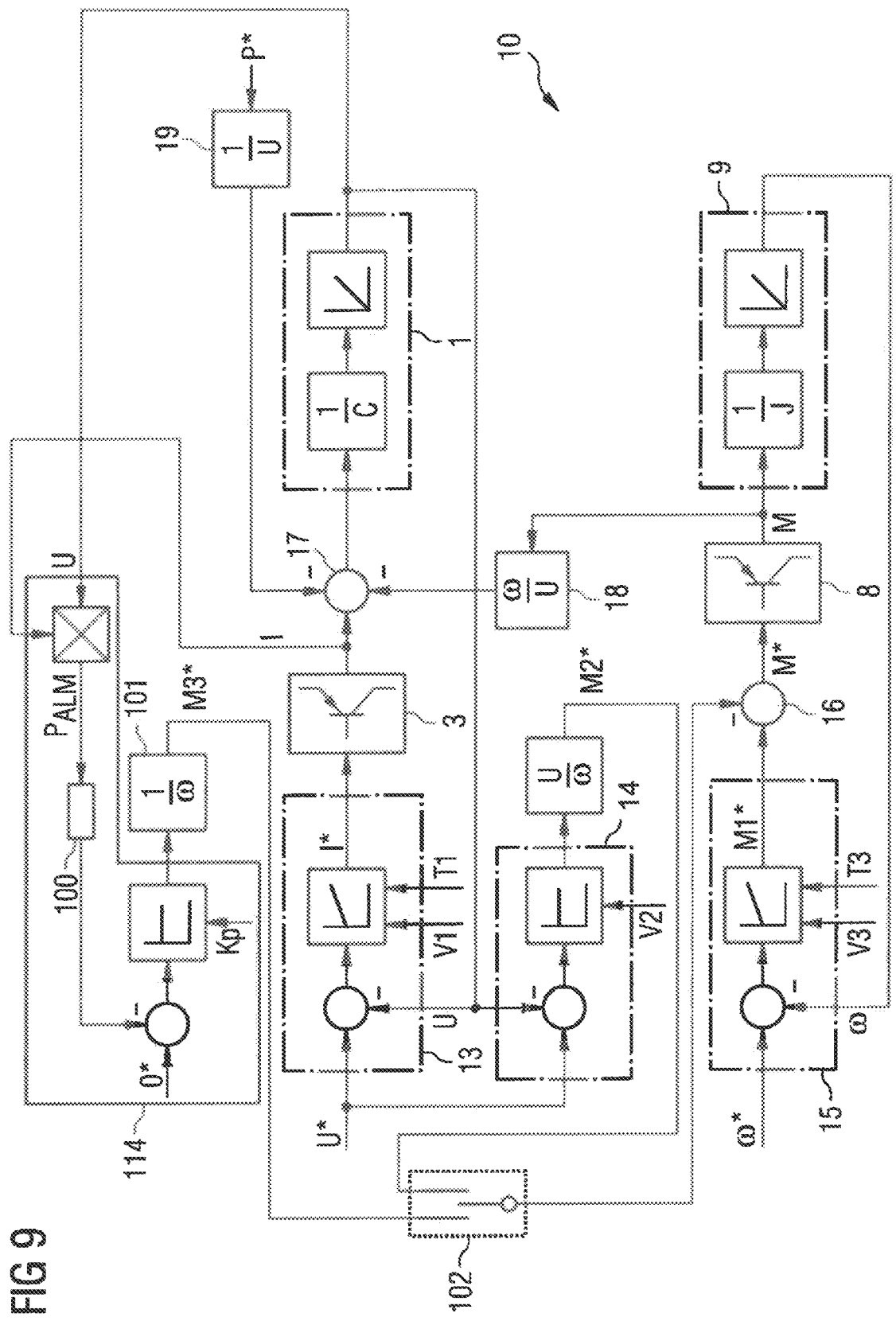
FIG. 9 shows a further possible embodiment of the internal structure of the control facility.

FIG. 9 shows a further possible embodiment of the internal structure of the control facility. The control facility 10 includes the power regulator 114 and a second voltage regulator 14. The control facility 10 implements the second voltage regulator 14 in which, based on the desired voltage U* and the actual voltage U, a second desired moment component M2* is determined for the kinetic energy store.

With the existence of a first system configuration, the second voltage regulator 14 is advantageously activated and the power regulator 114 is deactivated. With the existence of a second system configuration, the second voltage regulator 14 is advantageously deactivated and the power regulator 114 activated.

With the existence of the first system configuration, the first and the second desired moment component M1* and M2* are added to a desired moment M* and the buffer converter 8 is regulated accordingly. With the existence of the second system configuration, the first and the power-based desired moment component M1* and M3* are added to a desired moment M* and the buffer converter 8 is regulated accordingly. This is realized by way of a two-way switch 102. Advantageously, the two-way switch 102 can be switched according to the system configuration. While actuation of the two-way switch 102 is not shown in greater detail, it is advantageously realized by way of a parameterization.

While both the power regulator 114 and the second voltage regulator 14 can be implemented, only one of the two acts in a manner specific to the system, however.

This embodiment is advantageous since a control facility can be used for a large number of system types and requirements.

The embodiments described in FIG. 4, FIG. 5, FIG. 6, FIG. 7 and FIG. 8 can also be used in the embodiment described in FIG. 9.

Figure 10:
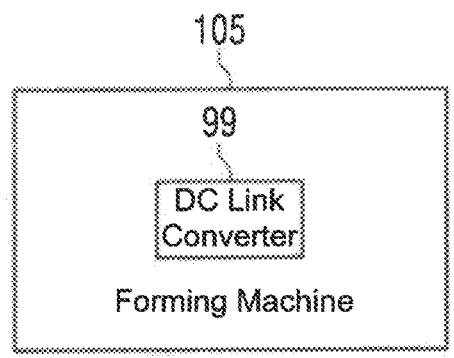
FIG. 10 shows a forming machine with a DC link converter.

FIG. 10 shows a schematic illustration of a forming machine 105 with a DC link converter 99. The forming machine 105 has a straight-line relative movement of the tools. The forming machine 105 can involve a press, e.g. a screw press, hydraulic press, servo press or pneumatic press.

While the invention has been illustrated and described in connection with currently preferred embodiments shown and described in detail, it is not intended to be limited to the details shown since various modifications and structural changes may be made without departing in any way from the spirit and scope of the present invention. The embodiments were chosen and described in order to explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. A control facility for controlling a DC link converter, the DC link converter comprising a DC link with a DC link capacitor and receiving electrical energy from a feed converter connected to a supply network and supplying electrical energy to a useful bad via a bad converter, the DC link converter further comprising a buffer converter coupled to a DC link of the DC link converter and connected to a kinetic energy store for bidirectional energy exchange, said control facility comprising:
   a first voltage regulator determining, based on a desired voltage and an actual voltage that drops across the DC link capacitor, a desired current for the feed converter and controlling the feed converter based on the determined desired current,
   a speed regulator determining, based on a desired speed and an actual speed of the kinetic energy store, a first desired moment component for the kinetic energy store,
   a power regulator determining, based on an actual power that is at least partially determined at the feed converter, a power-based desired moment component for the kinetic energy store, and
   a node adding the first desired moment component and the power-based desired moment component to form a desired moment and controlling the buffer converter using the formed desired moment.

2. The control facility of claim 1, wherein the actual power is formed based the actual voltage and the desired current, or based on the actual voltage and an actual current flowing through the feed converter.

3. The control facility of claim 1, wherein the power regulator is designed as a P controller with a proportional amplification.

4. The control facility of claim 1, wherein the power regulator comprises a high-pass filter which filters the actual power to eliminate a DC component of the actual power.

5. The control facility of claim 4, wherein the power regulator sets a desired value of an AC component of the high-pass-filtered actual power to zero to eliminate the AC component.

6. The control facility of claim 1, further comprising a second voltage regulator determining, based on the desired voltage and the actual voltage, a second desired moment component for the kinetic energy store,
   wherein when a first system configuration exists, the second voltage regulator is activated and the power regulator is deactivated, and the first desired moment component and the second desired moment component are added to form the desired moment which is used to control the buffer converter,
   wherein when a second system configuration exists, the second voltage regulator is deactivated and the power regulator is activated, and the first desired moment component and the power-based desired moment component are added to form the desired moment which is used to control the buffer converter.

7. The control facility of claim 6, wherein the second voltage regulator is designed as a P controller and a proportional amplification of the second voltage regulator is determined such that the second voltage regulator substantially corrects a jump of the desired voltage during part of a period.

8. The control facility of claim 1, wherein an instantaneous power demand oscillates with an oscillation period between a minimum value and a maximum value, said first voltage regulator being designed as a PI controller having a proportional amplification and a reset time, with the proportional amplification and the reset time of the first voltage regulator being determined such that the first voltage regulator corrects only to a small extent a jump of the desired voltage during part of a period.

9. The control facility of claim 1, further comprising a pilot control circuit receiving an instantaneous power demand and high-pass filtering the instantaneous power demand, with the pilot control circuit determining, based on the high-pass-filtered instantaneous power demand, a pilot control signal, which is added to the first desired moment component and the power-based desired moment component or is added the first desired moment component and the second desired moment component, to form the desired moment.

10. The control facility of claim 9, wherein in a first operating state of the control facility, both the power-based voltage regulator and the pilot control circuit are activated, and in a second operating state of the control facility, alternatively the power-based voltage regulator is activated and the pilot control circuit is deactivated or the power-based voltage regulator is deactivated and the pilot control circuit is activated.

11. The control facility of claim 10, wherein the first operating state of the control facility is an ongoing operation of the DC link converter, while the second operating state of the control facility is a start-up of the DC link converter.

12. The control facility of claim 9, wherein the pilot control circuit comprises an integrator integrating the pilot control signal and a delay element connected downstream of the integrator and delaying the pilot control signal, the integrated and delayed pilot control signal being supplied to the speed regulator as an additional input signal.

13. The control facility of claim 1, wherein an instantaneous power demand oscillates with an oscillation period between a minimum value and a maximum value, said speed regulator being designed as a PI controller having a proportional amplification and a reset time, with the proportional amplification and the reset time of the speed regulator being determined such that the first voltage regulator corrects substantially a jump of the desired rotation speed during part of a period.

14. The control facility of claim 1, wherein an instantaneous power demand oscillates with an oscillation period between a minimum value and a maximum value, said speed regulator being designed as a PI controller having a proportional amplification and a reset time, with the proportional amplification and the reset time of the speed regulator being determined such that the first voltage regulator corrects only to a small extent a jump of the desired rotation speed during part of a period.

15. A DC link converter, comprising:
a DC link with a DC link capacitor,
a feed converter supplying electrical energy from a supply network to the DC link,
a load converter supplying electrical energy from the DC link to a useful load,
a buffer converter which couples a kinetic energy store to the DC link for bidirectional energy exchange, and
a control facility, which controls the feed converter, the load converter and the buffer converter, the control facility comprising a first voltage regulator determining, based on a desired voltage and an actual voltage that drops across the DC link capacitor, a desired current for the feed converter and controlling the feed converter based on the determined desired current, a speed regulator determining, based on a desired speed and an actual speed of the kinetic energy store, a first desired moment component for the kinetic energy store, a power regulator determining, based on an actual power that is at least partially determined at the feed converter, a power-based desired moment component for the kinetic energy store, and a node adding the first desired moment component and the power-based desired moment component to form a desired moment and controlling the buffer converter using the formed desired moment.

16. The DC link converter of claim 15, wherein the kinetic energy store is constructed as a rotating flywheel.

17. A forming machine, comprising:
a DC link converter having a DC link with a DC link capacitor,
a feed converter supplying electrical energy from a supply network to the DC link,
a load converter supplying electrical energy from the DC link to a useful load,
a buffer converter which couples a kinetic energy store to the DC link for bidirectional energy exchange, and
a control facility, which controls the feed converter, the load converter and the buffer converter, the control facility comprising a first voltage regulator determining, based on a desired voltage and an actual voltage that drops across the DC link capacitor, a desired current for the feed converter and controlling the feed converter based on the determined desired current, a speed regulator determining, based on a desired speed and an actual speed of the kinetic energy store, a first desired moment component for the kinetic energy store, a power regulator determining, based on an actual power that is at least partially determined at the feed converter, a power-based desired moment component for the kinetic energy store, and a node adding the first desired moment component and the power-based desired moment component to form a desired moment and controlling the buffer converter using the formed desired moment.

18. The forming machine of claim 17, wherein the forming machine is embodies as a press.

* * * * *

UNITED STATES PATENT AND TRADEMARK OFFICE
CERTIFICATE OF CORRECTION

| | | |
|---|---|---|
| PATENT NO. | : 11,689,114 B2 | Page 1 of 1 |
| APPLICATION NO. | : 17/219223 | |
| DATED | : June 27, 2023 | |
| INVENTOR(S) | : Bernd Dietz, Gerald Reichl and Elmar Schäfers | |

It is certified that error appears in the above-identified patent and that said Letters Patent is hereby corrected as shown below:

In the Claims

In Column 10, Claim 1, Line 6: replace "..to a useful bad via a bad converter" with the correct phrasing --..to a useful load via a load converter--.

Signed and Sealed this
Twenty-fifth Day of July, 2023

Katherine Kelly Vidal
*Director of the United States Patent and Trademark Office*